Dec. 22, 1925.
R. K. LEE
INTERNAL COMBUSTION ENGINE
Filed March 14, 1925
1,566,486
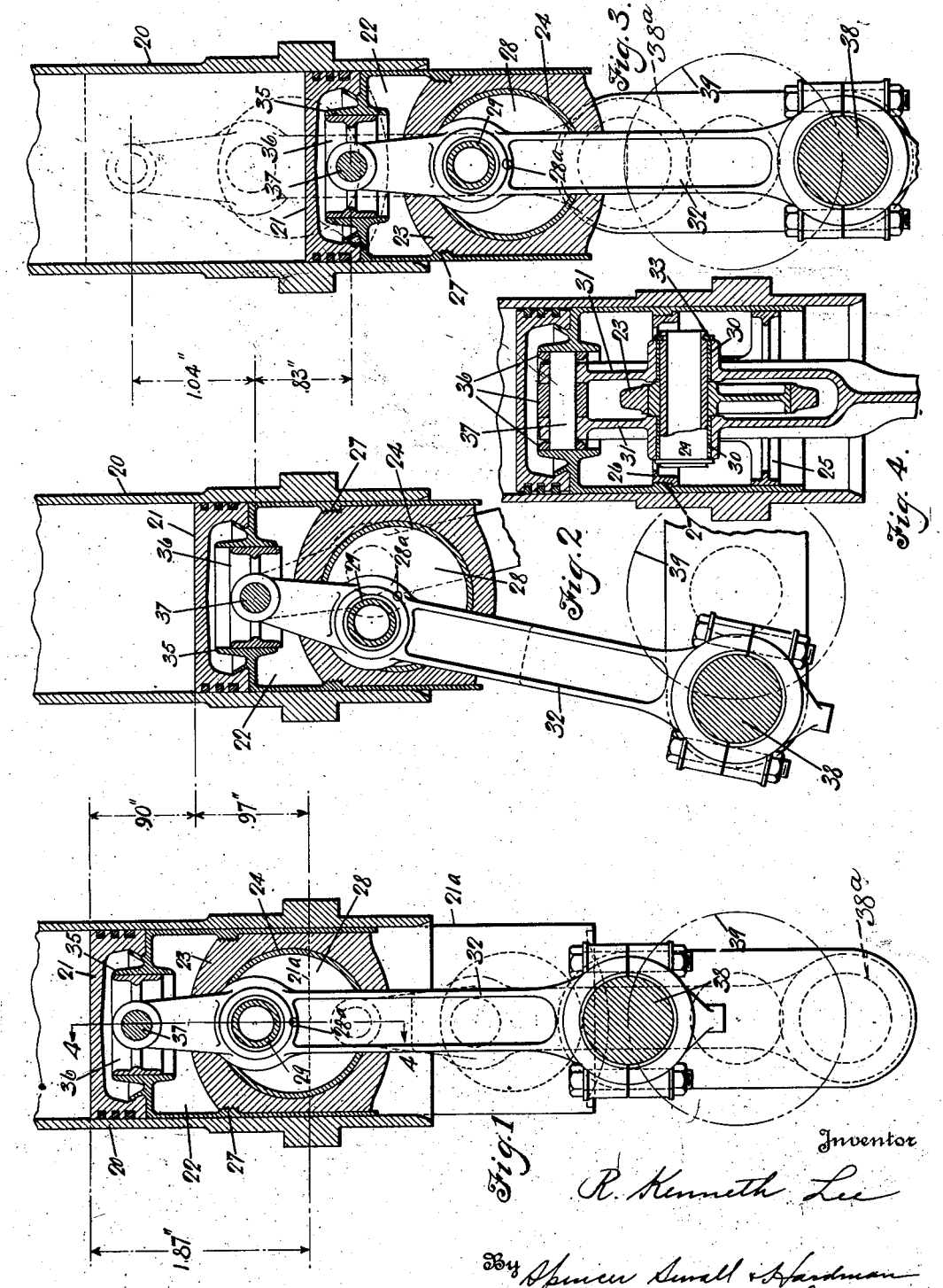
Inventor
R. Kenneth Lee
By Spencer Small & Hardman
his Attorneys Patented Dec. 22, 1925.

1,566,486

UNITED STATES PATENT OFFICE.

ROGER KENNETH LEE, OF DAYTON, OHIO, ASSIGNOR TO GENERAL MOTORS RESEARCH CORPORATION, OF DAYTON, OHIO, A CORPORATION OF DELAWARE.

INTERNAL-COMBUSTION ENGINE.

Application filed March 14, 1925. Serial No. 15,648.

*To all whom it may concern:*

Be it known that I, ROGER KENNETH LEE, a citizen of the United States of America, residing at Dayton, county of Montgomery, and State of Ohio, have invented certain new and useful Improvements in Internal-Combustion Engines, of which the following is a full, clear, and exact description.

This invention relates to engines and particularly to multi-cylinder internal combustion engines having cranks arranged at 180 degrees.

It is well known that in the conventional type of engine, comprising a crankshaft, a piston and a connecting rod, that the movement of the piston and rod toward the crank is greater during the first quarter revolution of the crank from head end dead center than during the last quarter revolution. In an engine having cranks arranged at 180 degrees, such as a four cylinder internal combustion engine with cylinders arranged vertically, during the first quarter revolution of the cranks from dead center, the inertia forces produced by the downwardly moving masses will be greater than the inertia forces produced by the masses moving upwardly; and, during the next quarter revolution of the cranks the inertia forces produced by the upwardly moving masses will be the greater. This causes an objectionable vibration of the engine.

The chief object of this invention is to remove the cause of this vibration by making the resultant of all the inertia forces produced by the reciprocating parts equal to zero for each position of the crank shaft. In the present invention this object is accomplished by causing, at each instant of crank rotation, the difference in the inertia forces acting upon the crank shaft due to the movement of the connecting rods in opposite directions to be offset by a difference in the opposite sense in the inertia forces due to the movement of the pistons in opposite directions.

Further objects and advantages of the present invention will be apparent from the following description, reference being had to the accompanying drawings, wherein a preferred form of embodiment of the present invention is clearly shown.

In the drawings:

Figs. 1, 2 and 3 are fragmentary views partly in section of a multi-cylinder internal combustion engine having cranks at 180 degrees and apparatus associated therewith embodying the present invention. Figs. 1 and 3 show positions of the apparatus at the ends of the piston strokes and Fig. 2 shows the apparatus at intermediate positions of the piston and crank.

Fig. 4 is a sectional view on the line 4—4 of Fig. 1.

In the drawings, 20 designates an engine cylinder within which reciprocates a piston having a head 21 and a skirt 22. Within the skirt 22 there is located an eccentric strap 23 provided with a bearing 24. The strap 23 is formed integrally with rings 25 and 26 and diametrically bridges the piston skirt 22. The rings 25 and 26 are supported laterally by the skirt 22 and endwise movement is prevented by attaching the ring 26 to the skirt 22 by a screw thread connection 27.

The strap 23 cooperates with an eccentric disk 28 having its center indicated at 28ª. Disk 28ª is provided with an eccentric opening for receiving an eccentric or crank pin 29, the ends of which are received by bearings 30 carried by the bifurcations 31 of a connecting rod 32. The eccentric pin 29 is hollow and is provided with annular grooves adjacent the ends thereof for receiving resilient wire split rings 33 which prevent endwise movement of the pin 29. The piston is provided with a cylindrical bearing 35 which receives a slidable reciprocating member 36 carrying a pin 37 which passes through openings in the ends of bifurcations 31 of connecting rod 32. Rod 32 is connected in the usual manner with a crank 38 of the engine crank shaft not shown. The path of movement of crank is indicated by a circle 39 in dot and dash lines.

As the piston moves from upper or head end dead center position shown in Fig. 1 to lower or crank end dead center position shown in Fig. 3, the eccentric is oscillated by the swinging of the connecting rod away from and toward the center line of the piston. Assuming the cylinder to be in a vertical position, it will be noted that, when the crank 38 has moved 90° away from the upper dead center, the eccentric disk has been rotated so as to bring the horizontal plane of the axis 28ᵃ of the disk 28 closer to the horizontal plane of the axis of the pin 29. In other words the piston has been lifted with respect to the connecting rod, or moved relative to the rod in such direction as to cause the piston to move more slowly toward the crank shaft than it would if connected in the usual manner with the crank.

During the movement of the crank 38 toward lower dead center the eccentric disk 28 is oscillated back again so as to bring the axis of pin 29 vertically above the axis 28ᵃ of eccentric 28. Relative movement of the piston and rod in the direction of the piston strokes occurs again in the second quadrant of crank travel, the piston being lowered relatively to the rod instead of being lifted as during the first quadrant. Therefore the piston tends to move faster toward the crank shaft during the second quadrant of crank movement than it would in the conventional engine.

Numeral 38ᵃ indicates a crank pin located at 180 degrees from the pin 38, and the rod, piston and other parts associated with the pin 38ᵃ are indicated by letter "a" affixed to numerals corresponding to those indicating parts already described. By properly proportioning the eccentricity of the pin 29 and the distances between the axes of crank 38, pin 29 and pin 37, the pistons can be made to travel in such a manner that, at each instant of crank rotation, the difference in inertia forces acting upon the crank shaft due to movement of rods 32 and 32ᵃ will be offset by a difference in the opposite sense in the inertia forces due to the movement of pistons 21 and 21ᵃ.

In the drawings, the dimensions indicate approximately the movements of the pistons and rods for each quarter revolution of the cranks from dead center for a piston stroke of 1.87 inches. During the first quarter revolution, the piston 21 moves downwardly .90 inch while the piston 21ᵃ moves upwardly .97 inch. The resultant of the inertia forces caused by movement of the piston is downward during the first quarter revolution. Rod 32, pin 37 and sleeve 36 move 1.04 inch during the first quarter revolution from the position shown in Fig. 1 to that shown in Fig. 2, while rod 32ᵃ, pin 37ᵃ and sleeve 36ᵃ move upwardly .83 inch. The resultant of the inertia forces of these parts is upward during the first quarter revolution. During this and the next quarter revolution the sum of these resultants will be substantially zero at each instant of crank shaft rotation. In this calculation the usual engineering practice is followed of considering a portion of the connecting rod as a body having reciprocation and the remainder as a body rotating about the crank shaft.

It is apparent that the present invention is not limited in its application to the balancing of an internal combustion engine since it is obvious that the invention may be applied to any machine which includes a pair of parallel guides, members such as cross heads slidable within the guides and a crank having crank pins arranged at 180° and each pin connected by a rod with one of the slidable members.

While the form of embodiment of the present invention as herein disclosed, constitutes a preferred form, it is to be understood that other forms might be adopted, all coming within the scope of the claims which follow.

What is claimed is as follows:

1. An engine comprising, in combination, a crank shaft having crank pins arranged at 180°, a plurality of cylinders and pistons, a rod for connecting each piston with a crank pin, and means associated with each rod for causing, at each instant of crank rotation, the difference in the inertia forces acting upon the crank shaft due to the movement of the rods in opposite directions to be offset by a difference in the inertia forces due to the movement of the pistons in opposite directions.

2. An engine comprising, in combination, a crank shaft having crank pins arranged at 180°, a plurality of cylinders and pistons, a rod for connecting each piston with a crank pin, and means for effecting, in response to the swinging of the rod, such relative movement between each piston and its rod as to cause, at each instant of crank rotation, the difference in the inertia forces acting upon the crank shaft due to the movement of the rods in opposite directions to be offset by a difference in the inertia forces due to the movement of the pistons in opposite directions.

3. An engine comprising, in combination, a crank shaft having crank pins arranged at 180°, a plurality of cylinders and pistons, a rod for connecting each piston with a crank pin, and means including an oscillatable device actuated by each rod for effecting, in response to the swinging of the rod, such relative movement between each piston and its rod as to cause, at each instant of crank rotation, the difference in the inertia forces acting upon the crank shaft due to the movement of the rods in opposite directions to be offset by a difference in the inertia forces due to the movement of the pistons in opposite directions.

4. An engine comprising, in combination, a crank shaft having crank pins arranged at 180°, a plurality of cylinders and pistons, a rod for connecting each piston with a crank pin, and means including an oscillatable device connecting each piston and rod for effecting, in response to the swinging of the rod, such relative movement between each piston and its rod as to cause, at each instant of crank rotation, the difference in the inertia forces acting upon the crank shaft due to the movement of the rods in opposite directions to be offset by a difference in the inertia forces due to the movement of the pistons in opposite directions.

5. An engine comprising, in combination, a crank shaft having crank pins arranged at 180°, a plurality of cylinders and pistons, a rod for connecting each piston with a crank pin, and means including a single cam device actuated by each rod for effecting, in response to the swinging of the rod, such relative movement between each piston and its rod as to cause, at each instant of crank rotation, the difference in the inertia forces acting upon the crank shaft due to the movement of the rods in opposite directions to be offset by a difference in the inertia forces due to the movement of the pistons in opposite directions.

6. An engine comprising, in combination, a crank shaft having crank pins arranged at 180°, a plurality of cylinders and pistons, a rod for connecting each piston with a crank pin, and means including an oscillating cam actuated by each rod for effecting, in response to the swinging of the rod, such relative movement between each piston and its rod as to cause, at each instant of crank rotation, the difference in the inertia forces acting upon the crank shaft due to the movement of the rods in opposite directions to be offset by a difference in the inertia forces due to the movement of the pistons in opposite directions.

7. An engine comprising, in combination, a crank shaft having crank pins arranged at 180°, a plurality of cylinders and pistons, a rod for connecting each piston with a crank pin, and means including an oscillating eccentric actuated by each rod for effecting, in response to the swinging of the rod, such relative movement between each piston and its rod as to cause, at each instant of crank rotation, the difference in the inertia forces acting upon the crank shaft due to the movement of the rods in opposite directions to be offset by a difference in the inertia forces due to the movement of the pistons in opposite directions.

8. An engine comprising, in combination, a crank shaft having crank pins arranged at 180°, a plurality of cylinders and pistons, a rod for connecting each piston with a crank pin, and means including an oscillating eccentric connecting each rod and piston for effecting, in response to the swinging of the rod, such relative movement between each piston and its rod as to cause, at each instant of crank rotation, the difference in the inertia forces acting upon the crank shaft due to the movement of the rods in opposite directions to be offset by a difference in the inertia forces due to the movement of the pistons in opposite directions.

9. An engine comprising, in combination, a crank, a piston, a slidable member, a rod having its ends connected respectively with the crank and member, and means connecting an intermediate portion of the rod with the piston for obtaining movement of the piston relative to the rod in response to the swinging of the rod.

10. An engine comprising, in combination, a crank, a piston, a slidable member, a rod having its ends connected respectively with the crank and member, and a crank connecting the piston with an intermediate portion of the rod for obtaining movement of the piston relative to the rod in response to the swinging of the rod.

11. An engine comprising, in combination, a crank, a piston, a member slidably supported by the piston, a rod having its ends connected respectively with the crank and member, and a crank connecting the piston with an intermediate portion of the rod for obtaining movement of the piston relative to the rod in response to the swinging of the rod.

12. An engine comprising, in combination, a crank, a piston carrying an eccentric strap, a member slidably supported by the piston, a rod having its ends connected respectively with the crank and slidable member, and an eccentric within said strap and connected with the rod for obtaining movement of the piston relative to the rod in response to the swinging of the rod.

13. An engine comprising, in combination, a crank, a piston having a head, a skirt, an eccentric strap carried by the piston within the skirt and bridging the wall of the skirt diametrically, a member slidably supported by the piston between the head and strap, a connecting rod connected with the crank and having a bifurcated portion embracing the eccentric strap and connected with the slidable member, and an eccentric within said strap and connected with said bifurcated portion of the connecting rod.

14. An engine comprising, in combination, a pair of cylinders, pistons each slidable within a cylinder, a crank having pins arranged at 180°, a rod connecting each piston and crank pin, and means for producing differential movement between each rod and piston connected therewith in order that, at each instant of crank rotation, the difference in the inertia forces acting upon the crank shaft due to the movements of the rods in opposite directions will be offset by a difference in the inertia forces due to the movements of the pistons in opposite directions.

15. A machine comprising, in combination, a pair of parallel guides, members each slidable within a guide, a crank having pins arranged at 180°, rods each connecting a slidable member with a crank pin, and means associated with each rod for causing, at each instant of crank rotation, the difference in the inertia forces acting upon the crank shaft due to the movement of the rods in opposite directions to be offset by a difference in the inertia forces due to the movement of the slidable members in opposite directions.

In testimony whereof I hereto affix my signature.

R. K. LEE.